United States Patent [19]
Bequet et al.

[11] 3,834,853
[45] Sept. 10, 1974

[54] DEVICE FOR MAKING SHEETS

[75] Inventors: Jean Francois Bequet, Brussels; Paul Dubois, Braine-1 Alleud; Roger Van Asbroeck, Neerijse, all of Belgium

[73] Assignee: Solvay & Cie, Brussels, Belgium

[22] Filed: Apr. 25, 1972

[21] Appl. No.: 247,271

[30] Foreign Application Priority Data
May 10, 1971 Belgium .............................. 766911

[52] U.S. Cl................................ 425/336, 425/396
[51] Int. Cl.............................................. B28b 3/12
[58] Field of Search .......... 425/336, 369, 370, 371, 425/396, 303; 164/279; 264/286, 287; 72/181

[56] References Cited
UNITED STATES PATENTS
2,163,063  6/1939  Romanoff...................... 425/336 X
3,516,116  6/1970  Ladyjenski......................... 425/370
3,570,066  3/1971  Neifeld et al. .................. 425/336 X
3,744,952  7/1973  Bequet et al....................... 425/336

FOREIGN PATENTS OR APPLICATIONS
1,223,048  6/1960  France............................... 425/370
1,335,521  7/1963  France............................... 425/369

Primary Examiner—J. Spencer Overholser
Assistant Examiner—John E. Roethel
Attorney, Agent, or Firm—Spencer & Kaye

[57] ABSTRACT

Device for continuous longitudinal corrugation of sheets of thermoplastic material including two sets of interdigitated endless bands which follow a rectilinear path in the zone where the sheets are cooled, the bands being guided at least over the portions thereof which contact the sheets by supports which act on that face of the band which is not in contact with the sheets.

11 Claims, 3 Drawing Figures

DEVICE FOR MAKING SHEETS

BACKGROUND OF THE INVENTION

The present invention relates to a device for the continuous longitudinal corrugation of sheets of thermoplastic material, and also to the corrugated sheets obtained with the aid of this device.

The interest taken by the building industry in longitudinally corrugated long span sheets is well known.

In their previous patent (Belgian Pat. No. 743,923 of Dec. 31, 1969) the applicants have already described a device which is particularly suitable for the longitudinal corrugation of sheets of polymers in the plastic state, which is characterized in that it comprises continuous metal wires welded end to end and disposed and supported in space in the positions where the sheets are to be folded in order to obtain the desired corrugation, these wires accompanying the sheets during their passage through the device.

This device, which permits reliable continuous production of corrugated products of good quality from optionally biorientated thermoplastic material sheets, is nevertheless limited in its application because it permits only the production of corrugated sheets whose profile is polygonal, (broken line).

SUMMARY OF THE INVENTION

An object of the present invention is to provide a device which permits the economical continuous production of longitudinally corrugated products of good quality and the profile of which may be either polygonal or curvilinear.

The device according to the present invention is composed of two series of movable shaping elements suitably spaced apart and progressively imbricated in one another. These shaping elements are composed of continuous bands of suitable profile which move together with the sheets to be corrugated and follow a rectilinear path in the zone in which the shaped sheets are cooled. These belts are supported and guided, at least on their portion which is in contact with the sheets to be corrugated, by supports acting on their face which is not in contact with the sheets to be corrugated.

According to the invention it is possible to make a substantial saving with respect to the consumption of calories during the operation of the device by so selecting the material of which the continuous bands are composed that these bands have thermal conductivity lower than $10^{-2}$ cal/cm.sec.°C and, preferably lower than $10^{-3}$ cal/cm.sec.°C.

This material may advantageously be selected from the group formed by woods, natural and synthetic rubbers, thermoplastic polymers such as polyamides, polyaldehydes, polyolefins, polycarbonates, etc., this list being enumerative and not limitative.

GENERAL DESCRIPTION OF THE INVENTION

According to a first preferred variant, the supports for the bands constituting the shaping elements are composed of successive shells moving substantially at the same speed as the sheets to be corrugated.

In this case, the corrugation device is composed of two corrugating plates between which the sheet to be corrugated pass, the sheet being held by its edges, for example with the aid of grippers which drive it through the device.

The corrugating plates, which face one another, are mounted in such a manner that they can be moved away from and towards one another, the plates being moved towards one another during the normal operation of the device.

Each corrugating plate is provided with a series of parallel guide rails judiciously spaced in accordance with the profile of the corrugations to be produced. Endless chains driven by means of drive sprocket wheels at a speed substantially equal to that of the sheets passing through this device slide over these rails. These chains support successive shells which are contiguous or close to one another and which are profiled in such a manner as to receive the continuous shaping bands of appropriate section. The profile of the guide rails is so selected that during the displacement of the shells the shaping elements are progressively imbricated in one another and then follow a rectilinear path.

The shaping bands are made in the form of closed loops. The return path of these bands may optionally be identical to that of the shells, or it may be different. In the latter case it is convenient for the walls of the shells to be so profiled as to guide the shaping bands to the inlet of the corrugating device.

The device is in addition completed by elements for cooling the sheets to be treated, these elements being disposed along the rectilinear path imposed by the guide rails and being fixed on the corrugating plates between said guide rails.

When the device described above is to be put into operation, the continuous sheet of thermoplastic material which is to be corrugated is brought to a suitable temperature for its corrugation and pulled through the corrugation device by the grippers which hold its edges, the corrugating plates having been moved apart. The corrugating plates are then progressively moved towards one another until their shaping elements are imbricated in one another, so that they progressively impart the desired corrugated shape to the sheet. The device can then work normally.

In a modified embodiment the supports for the bands constituting the shaping elements may be fixed guides over which the bands slide. In this case the corrugating plates support only the fixed guides, which are judiciously spaced apart. The shaping bands are then driven by the sheet to be corrugated, which is pulled through the corrugating device.

The sheets of thermoplastic material which can be corrugated in the device according to the invention may be made of polyvinyl chloride, vinyl chloride based copolymers, acrylic resins, etc., this list being in no way limitative.

The portion of the shaping bands which is in contact with the sheet to be corrugated is profiled in accordance with the desired corrugation. In order to make sinusoidal corrugated sheets, this profile is rounded and has the desired shape and wavecrest curvature. On the other hand, in order to make polygonal corrugations this portion is flat and preferably has a width equal to the width desired for the wavecrest.

The distance between the axes of the guide rails of each corrugating plate, and consequently between the shaping elements, must obviously be equal to the desired pitch of corrugation, that is to say the distance separating two consecutive wavecrests situated on the same side of the sheet.

The device according to the invention is particularly suitable for corrugating sheets of thermoplastic material which have previously undergone biorientation drawing treatment. It is in fact found that sheets of this kind do not tend to tear during corrugation in this device. Moreover, the latter permits adequate cooling of corrugated sheets while they are held in shape. The biorientated corrugated products which can be achieved in this manner have improved mechanical characteristics and are found very advantageous in the field of civil engineering. It is naturally obvious that the device can also be used for corrugating sheets which have not undergone such biorientation treatment.

As previously stated, the selection of a material possessing low thermal conductivity for the production of the shaping bands enables manufacturing costs to be reduced.

Advantage is in fact taken of this property to limit heat exchanges between the sheets of thermoplastic material and the shaping elements during the corrugation.

It is in fact known that the corrugation of sheets of thermoplastic material is generally carried out at temperatures between 60 and 200°C, and that once the desired shape has been obtained the sheets are cooled below their softening temperature so as to retain the acquired shape when they pass out of the corrugating device.

Consequently, the applicants have found that by restricting as much as possible the exchange of heat between the sheets to be corrugated and the shaping elements with the aid of the low thermal conductivity of the latter:

it is not indispensable to preheat the shaping elements before they come into contact with the sheets to be corrugated, the loss of calories from the sheets during their corrugation and the transfer of these calories to the shaping elements remains low and the shaping is consequently effected under good conditions, the cooling of the corrugated sheets by blowing a cooling fluid on the opposite face to that where the shaping elements are situated remains easy.

It is thus found that the use of a material of a low thermal conductivity, that is to say lower than $10^{-2}$ cal/cm.sec.°C and preferably lower than $10^{-3}$ cal/cm.sec.°C makes it possible to achieve a substantial saving of calories, because in this case the shaping elements do not undergo any substantial thermal cycle during the operation of the device.

Taking into account the mechanical stresses to which the bands constituting the shaping elements are subjected, it is advisable for the material of which they are composed to be so selected as to impart to them a combination of mechanical properties which are desirable for the purpose of obtaining correct operation of the device during industrially acceptable periods of continuous operation.

It thus appears that in the course of the corrugation of sheets the shaping bands are subjected to compressive stresses by the sheets to be corrugated. This compression depends to a great extent on the state of tension of the sheets to be corrugated. It may be relatively slight in the case of thin sheets which have not undergone preliminary biorientation treatment, and may be greater when the sheets processed are of greater thickness or have undergone preliminary biorientation treatment with a view to producing corrugated sheets having improved mechanical properties.

It is consequently important that this compression should not entail excessive deformation of the cross-section of the shaping bands which would result in an alteration of the profile of the corrugated product obtained.

The applicants have found that it is consequently preferable to select the material of which the shaping bands are composed in such a manner that at the corrugation temperature this material has a hardness higher than 35 Shore A units, and preferably higher than 45 Shore A units.

In addition, because the shaping elements are made in the form of endless bands and in the course of the operation of the corrugating device they must assume a rectilinear shape when passing through the cooling section of the device, these bands are subjected to cyclic flexions.

These cyclic flexions, and to a lesser extent the compressive forces to which the bands are subjected, may entail either prohibitive permanent elongations of the bands or creep of the material in the course of time.

The successive elongations occurring in the extrados of the shaping bands depend in particular on the thickness of the latter and on their radius of curvature.

It is however not desirable for the thickness of the shaping bands to be reduced excessively or to give them too great a radius of curvature, because in the latter case the device would take up too much space.

During the operation of the device the exterior of the shaping bands consequently undergoes differential elongations varying from 0.3 to 10 percent, and these bands must undergo these elongations cyclically without exhibiting either fatigue or permanent deformation.

It is therefore advisable for the material of which the shaping bands are made to be so selected that at the corrugation temperature these bands have an elastic elongation greater than 0.3 percent.

It is also advisable for the shaping elements to have a tear resistance compatible with the tractive forces to which they are subjected. For this purpose it may be advantageous to reinforce the bands by means of a textile support disposed along their intrados or embedded in their thickness.

Finally, the shaping bands undergo friction during their work, and it is consequently preferable that at the corrugation temperature the material of which they are composed should have abrasion resistance sufficient to avoid too frequent stoppages for the purpose of replacing defective bands. The applicants have found that for this purpose it is preferable that the material used for making the shaping bands should exhibit an abrasive wear according to the standard DIN 53516 lower than 600 mm³, and preferably lower than 300 mm³.

The device according to the invention is in addition explained in detail in the description given below of its preferred form of construction.

It is however clearly understood that this description does not in any way limit the scope of the present invention, since the device described below may undergo numerous modifications without thereby departing from the framework or the spirit of the invention. In particular in the device described below the movable guides could be replaced by fixed guides.

DESCRIPTION OF THE PREFERRED EMBODIMENTS

Figure 1:
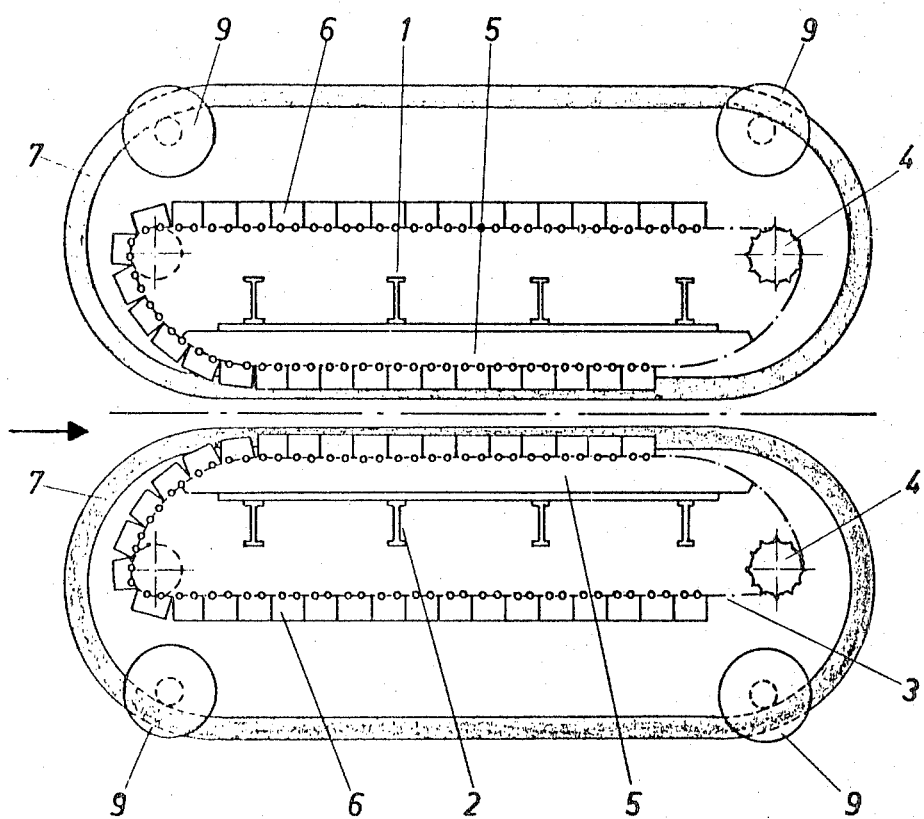
FIG. 1 is a diagrammatic side view of a corrugating device according to the invention.

In the drawings only those elements which are necessary for the proper understanding of the invention have been shown. Furthermore, in FIG. 1 the corrugation plates are shown moved apart, whereas during operation they are moved towards one another so that their shaping elements are imbricated in one another.

As will be seen in the drawings, the corrugating device is composed of a frame (not shown), on which are mounted two superimposed corrugating plates 1 and 2, which can be moved towards or away from one another.

Each corrugating plate is equipped with a plurality of endless chains 3 spaced evenly apart and judiciously disposed in accordance with the profile of the corrugation to be produced. These endless chains are driven by means of drive sprockets 4 and move over guide rails 5. The endless chains 3 carry successive shells 6 profiled to receive the shaping elements constituted by endless bands 7 of appropriate section.

The profile of the guide rails 5 is such that the shells 6, and consequently the shaping elements 7, are progressively imbricated in one another during their movement and then follow a rectilinear path.

It is convenient for the side walls 8 of the shells to be so profiled as to position the shaping bands in the shaping region. The return path of the bands 7 is different from that of the shells 6, and in this position in space the shaping bands 7 are supported by means such as idler rollers 9 fastened to the frame of the device.

The speed of displacement of the chains 3 is so selected as to be substantially equal to the speed of movement of the sheet of thermoplastic material to be processed.

The device is in addition completed by elements 10 for cooling the sheets to be processed, these elements being disposed along the rectilinear trajectory imposed by the guide rails 5 and being fixed on the corrugating plates between said guide rails.

The device according to the invention and its operation are additionally illustrated by the practical examples of performance described below, these examples being given solely by way of illustration and without limitation.

Example 1

Figure 2:
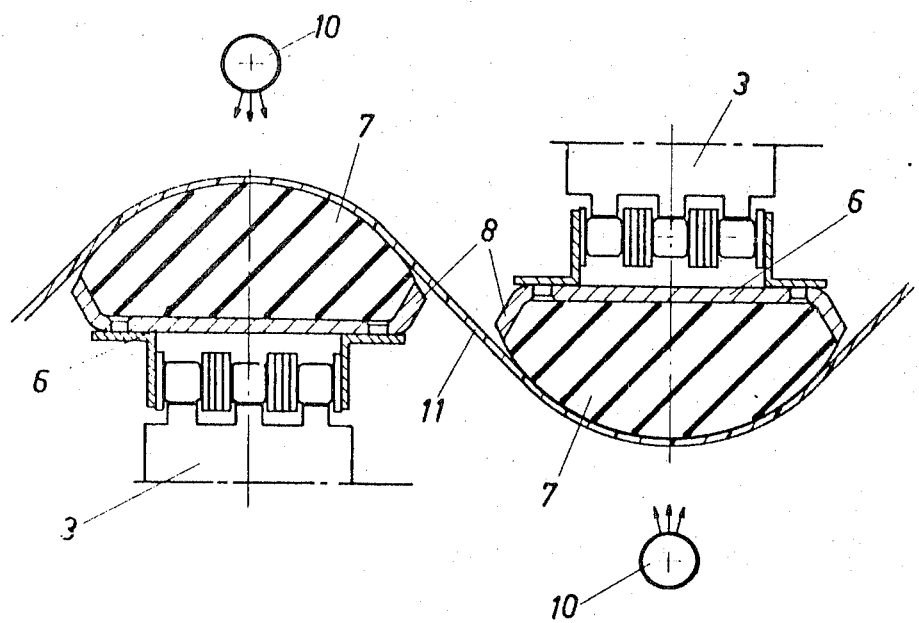
FIG. 2 is a partial elevational view of the same device, equipped with shaping elements suitable for producing corrugations of sinusoidal profile.

A corrugation device is constructed in accordance with FIGS. 1 and 2 to form a corrugated sheet having six sinusoidal waves over a width of 1.01 meter and with a height of 57 mm.

The top corrugating plate is equipped with seven shaping bands and the bottom plate with six shaping bands. These endless bands have a suitable profile and each of them has a developed length of 6.5 meters, a maximum thickness of 30 mm, and a maximum width of 70 mm. These bands are supported and driven by successive shells mounted on chains driven by a motor and guided on rails, of which the rectilinear forming and cooling portion amounts to 1.5 meters. These bands are made of silicone rubber having a hardness of 48 Shore A units, abrasive resistance of 455 mm$^3$ according to the standard DIN 53516 (German Industrial Standard) and thermal conductivity of $60.10^{-5}$ cal/cm.sec.°C.

A sheet of methyl polymethacrylate of a thickness of 0.45 mm, held by its edges and heated to 180°C, is engaged in the device and cooled while retaining its shape. The dead weight of the top corrugating plate, which weighs 3.5 tons, is sufficient to deform the sheet without the plates moving apart. The cooled sheet leaving the device has the desired profile and its appearance is faultless.

Example 2

In a corrugating device identical to that of Example 1, but in which the shaping bands are made of polyurethane rubber having the following characteristics:

hardness: 65 Shore A units thermal conductivity: $71.10^{-5}$ cal/cm.sec.°C.

abrasive resistance: 43 mm$^3$ according to the standard DIN 53 516 there is engaged a sheet of polyvinyl chloride of a thickness of 0.4 mm, which has just undergone preliminary biorientation treatment by 50 percent longitudinal drawing and 20 percent transverse drawing at 110°C, this sheet being held by its edge.

A force of 18 tons is applied to the top corrugating plate in order to bring it towards the bottom plate. The cooled sheet leaving the device has the desired profile. In the course of the operation it is found that the crushing of the bands is less than 0.1 mm.

Example 3

Figure 3:
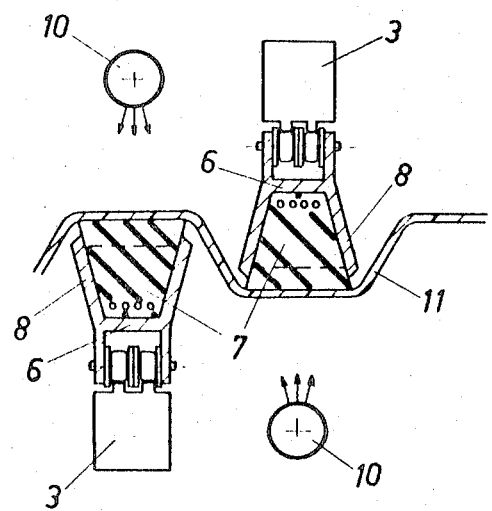
FIG. 3 is a partial elevational view of a similar device equipped with shaping elements adapted to produce corrugations of polygonal profile.

A corrugation device is constructed according to FIGS. 1 and 3 for forming a corrugated sheet having 34 polygonal waves over a width of 1.09 meter and with a height of 10 mm.

The top corrugating plate is equipped with 34 shaping bands and the bottom plate with 35 bands, these endless bands having a suitable profile and each of them having a developed length of 9 meters, a thickness of 8 mm, and a maximum width of 11 mm. These bands are supported and driven by successive shells mounted on chains driven by a motor and guided by rails, the rectilinear shaping and cooling portion of which amounts to 1.5 meter.

The bands are made by laminating three sheets of ash alternating with three sheets of hornbeam, along the grain.

At 15 percent humidity these woods have the following characteristics:

Ash

Thermal conductivity: $37.10^{-5}$ cal/cm.sec.°C

Elongation at break: 0.87%

Hornbeam

Thermal conductivity: $42.10^{-5}$ cal/cm.sec.°C

Elongation at break: 0.83%

There is introduced into the device a sheet of polyvinyl chloride with a thickness of 0.4 mm, a temperature of 105°C, which has been subjected to 50 percent longitudinal drawing and to transverse drawing, the sheet being firmly held by its edges. A force of 30 tons is necessary to hold the corrugating plates in position during operation. The corrugated sheet obtained has a very handsome appearance.

Example 4

A sheet of polyvinyl chloride is corrugated as in Example 3, using the same device apart from the fact that the shaping bands are made of polyacetal with a hardness of 73 Shore D units, thermal conductivity of $55.10^{-5}$ cal/cm.sec.°C, and elastic elongation of 2.4 percent.

A force of 27 tons is necessary to bring the corrugation plates together and to form the desired polygonal corrugation.

Example 5

A corrugating device is constructed in accordance with FIGS. 1 and 2 in order to form a corrugated sheet having 34 sinusoidal waves over a width of 1.09 meter and a height of 11 mm.

The top corrugating plate is equipped with 34 shaping bands and the bottom plate with 35 shaping bands, each of these bands having a developed length of 11 meters and being formed by a plurality of round wooden rods with a diameter of 11 mm, scarf jointed end to end over a length of 150 mm. These bands are supported and driven by successive shells fixed on driving chains guided by rails, the rectilinear shaping and cooling portion of which has a length of 1.5 meter.

Various species of wood, including hornbeam, ash, and walnut are employed indiscriminately and simultaneously. At 15 percent humidity walnut has a thermal conductivity equal to $35.10^{-5}$ cal/cm.sec.°C and an elongation at break of 1 percent.

There is introduced into the device a sheet of polyvinyl chloride with a thickness of 0.4 mm, a temperature of 100°C, which has undergone 50 percent longitudinal drawing and 20 percent transverse drawing, and which is held by its edges.

A force of 24 tons is necessary to bring the corrugating plates together and to form the desired sinusoidal wave.

As it may be observed from FIGS. 2 and 3, each band 7 has an effective outer surface which has a dimension and a shape that are substantially identical to the dimension and shape of a major portion of one corrugation. Thus, each band actually "embosses" the shape of its effective outer face on the thermoplastic sheet 11.

We claim:

1. A device for longitudinally corrugating a sheet of thermoplastic material in the plastic state by providing in the sheet a plurality of corrugations disposed side-by-side and each extending parallel to the length dimension of the sheet, comprising two series of movable continuous bands spaced apart and progressively imbricated in one another; a cooling zone through which at least a part of said bands move; said bands moving together with the sheet to be corrugated and arranged to follow a rectilinear path in said zone in which the shaped sheet is cooled; each band having a surface for contacting face-to-face and deforming the sheet to make one corrugation therein, said band surface being substantially identical in dimension and configuration to the desired dimension and configuration of a major part of one corrugation of the sheet; said bands being made of a material having a thermal conductivity lower than $10^{-2}$ cal/cm.sec.°C; and means for supporting and guiding said bands, at least over their portion which is in contact with the sheet to be corrugated, said means acting on the faces of the bands which are not in contact with the sheet to be corrugated.

2. A device as defined in claim 1, wherein said thermal conductivity is lower than $10^{-3}$ cal/cm.sec.°C.

3. A device as defined in claim 1 wherein the continuous bands of each series are narrow and are made of a material having a hardness higher than 35 Shore A units.

4. A device as defined in claim 3 wherein said bands are of a material having a hardness higher than 45 Shore A units.

5. A device as defined in claim 1 wherein the bands are made of a material having an elastic elongation greater than 0.3 percent.

6. A device as defined in claim 1 wherein the bands are made from a material which at the corrugating temperature exhibits abrasive wear, according to the standard DIN 53516, lower than 600 mm$^3$.

7. A device as defined in claim 6 wherein the material exhibits wear lower than 300 mm$^3$ according to said standard.

8. A device as defined in claim 1 wherein said means includes shells which move at the same speed as the sheets to be corrugated.

9. A device as defined in claim 1 wherein said means includes fixed guides.

10. A device as defined in claim 1 wherein the material of which the bands are made is selected from the group consisting of woods, natural or synthetic rubbers, polyamides, polyaldehydes, polyolefins and polycarbonates.

11. A device as defined in claim 1 wherein the bands have textile reinforcement.

* * * * *